(12) United States Patent
Schwarz

(10) Patent No.: US 6,530,714 B2
(45) Date of Patent: Mar. 11, 2003

(54) RETAINING-SPRING INSERT ARRANGEMENT

(75) Inventor: Helmut Schwarz, Weil der Stadt (DE)

(73) Assignee: Schwarz Verbindungs-Systeme GmbH, Althengstett (DE)

( * ) Notice: Subject to any disclaimer, the term of this patent is extended or adjusted under 35 U.S.C. 154(b) by 71 days.

(21) Appl. No.: 09/742,007

(22) Filed: Dec. 22, 2000

(65) Prior Publication Data

US 2001/0005470 A1 Jun. 28, 2001

(30) Foreign Application Priority Data

Dec. 24, 1999 (DE) ..................... 299 22 800 U

(51) Int. Cl.$^7$ ................................. F16B 5/06
(52) U.S. Cl. ....................................... 403/280
(58) Field of Search .................. 403/280, 292, 403/294, 297, 309, 300, 310, 313, 314, 319, 315, 325, 321, 408.1, 326, 327

(56) References Cited

U.S. PATENT DOCUMENTS 4,274,323 A  6/1981  Resnicow
5,039,266 A  8/1991  Nagayoshi et al.
5,921,734 A  7/1999  Kataoka

FOREIGN PATENT DOCUMENTS

| DE | 4109902 | 10/1991 |
| DE | 29721068 | 3/1998 |
| DE | 29821172 | 3/1999 |
| DE | 29920498 | 3/2000 |
| DE | 29920499 | 3/2000 |
| EP | 454914 | 11/1991 |
| EP | 905390 | 3/1999 |
| FR | 2064487 | 7/1971 |

Primary Examiner—Christopher J. Novosad
(74) Attorney, Agent, or Firm—Greenblum & Bernstein, P.L.C.

(57) ABSTRACT

Retaining-spring insert arrangement that includes two half chambers arranged to form a chamber with a hollow section, and a retaining spring arranged within the chamber that is adapted to engage a connecting part which is insertable into the chamber.

32 Claims, 3 Drawing Sheets

RETAINING-SPRING INSERT ARRANGEMENT

CROSS-REFERENCE TO RELATED APPLICATIONS

The present application claims priority under 35 U.S.C. § 119 of German Patent Application No. 299 22 800.2, filed on Dec. 24, 1999, the disclosure of which is expressly incorporated by reference herein in its entirety.

BACKGROUND OF THE INVENTION

1. Field of the Invention

The present invention relates to a retaining-spring insert arrangement. In the same way thread inserts are used in components to enable them to be connected by bolts, so-called "retaining-spring insert arrangements" are utilized to permit connection with a bolt fixed to another component. This bolt forms a releasable spring-actuated form fit with the retaining spring.

2. Discussion of Background Information

Connection arrangements making use of bolts and retaining springs are described, for example, in the German utility patents 299 204 99.5 or 299 204 98.7.

A certain retaining-spring insert arrangement known to the prior art is depicted in FIG. 3 having a single-part chamber, e.g., of metal, to which the retaining spring is permanently connected, e.g., by calking. The metallic material necessarily has a higher weight, which is undesirable, e.g., in aircraft construction.

In addition, with a single-part chamber of the above-noted kind, the retaining spring must be attached permanently, which requires an additional manufacturing process.

SUMMARY OF THE INVENTION

The present invention provides a retaining-spring insert arrangement which does not suffer from the above-noted drawbacks.

Accordingly, the instant invention eliminates the need for permanent attachment between the retaining spring and the chamber, and the retaining spring can be inserted loosely into a chamber formed of chamber halves. Further, the chamber may be made, e.g., of plastic parts.

The instant invention is directed to a retaining-spring insert arrangement that includes two half chambers arranged to form a chamber with a hollow section, and a retaining spring arranged within the chamber that is adapted to engage a connecting part which is insertable into the chamber.

In accordance with a feature of the invention, the half chambers are connectable to one another via a projection and a corresponding recess arranged on opposing half chambers. Further, the projection can include a tappet and the recess can include a hole.

According to another feature of the instant invention, the half chambers can be identical.

An exterior portion of the half chambers may include recesses and projections arranged to prevent at least one of movement and turning relative to each other.

In accordance with still another feature of the present invention, the half chambers have upper edge parts and lower edge parts which are arranged to point outwardly.

Further, an interior of each half chamber may include recesses and projections arranged to receive part of the retaining spring and to prevent at least one of movement and turning of the retaining spring in the chamber.

The retaining spring can include at least one free arm having an end adapted to engage the connecting part. The retaining spring may include a base part with two free spring arms arranged to extend from opposite ends of the base part. Ends of the two free spring arms may be inclined toward one another and can be spaced from each other at a certain distance. The base part can have an approximately square or rectangular contour.

Moreover, the retaining spring and the chamber can include openings aligned with one another, which are adapted to receive the connecting part. The opening of the chamber may be arranged on one surface of the chamber. The opening of the chamber may be arranged on more than one surface of the chamber.

In accordance with a further feature of the invention, the arrangement can be attached to another component by one of adhesive bonding and casting.

Further, the half chambers can be composed of plastic.

The present invention is directed to an apparatus for receiving a connecting part that includes a chamber including two half chambers arranged to form a hollow section, and a retaining spring located within the hollow section and arranged to engage at least a portion of the connecting part.

According to a feature of the present invention, the two half chambers may be coupled to each other via at least a projection and a corresponding recess.

Further, a first half chamber may include a first projection and a first recess, and a second half chamber may include a second projection and a second recess. The first projection can be arranged for insertion into the second recess and the second projection can be arranged for insertion into the first recess.

Each of the two half chambers may include grooves arranged to slidably receive at least a portion of the retaining spring, thereby coupling the retaining spring to the chamber. The retaining spring may include at least two free arms extending from a base and directed toward each other. Further, the at least a portion of the retaining spring which is slidably received by the grooves can be an edge of the base. Moreover, the at least a portion of the retaining spring which is slidably received by the grooves can be a part of the base from which the at least two free arms do not extend. The at least two free arms can be spaced from each other, and engagement with the at least a portion of the connecting part at least may initially separate the at least two free arms away from each other. Further, the at least two free arms may be biased toward each other at least during engagement with the at least a portion of the connecting part. Still further, each of the two half chambers can further include recesses arranged to facilitate pivotal movement of at least a portion of the retaining spring. The grooves and the recesses can be arranged to restrict rotation of the retaining spring within the hollow chamber. Each of the two half chambers can further include recesses arranged to facilitate pivotal movement of at least a portion of the retaining spring. The grooves and the recesses may be arranged to rotatably fix the retaining spring within the hollow chamber.

According to another feature of the invention, each of the two half chambers may include recesses arranged to facilitate movement of at least a portion of the retaining spring during engagement with the at least a portion of the connecting part.

The chamber may include at least one opening and the retaining spring can include an opening aligned with the at least one opening. The at least one opening of the chamber and the opening of the retaining spring are adapted to permit passage of at least a part of the connecting part.

Further, the chamber may include an upper and a lower opening aligned with each other and the retaining spring may include an opening aligned with the upper and lower openings. The upper and lower openings of the chamber and the opening of the retaining spring are adapted to permit passage of at least a part of the connecting part.

In accordance with yet another feature of the instant invention, the chamber can include upper and lower edge parts extending radially outwardly.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of nonlimiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1A:
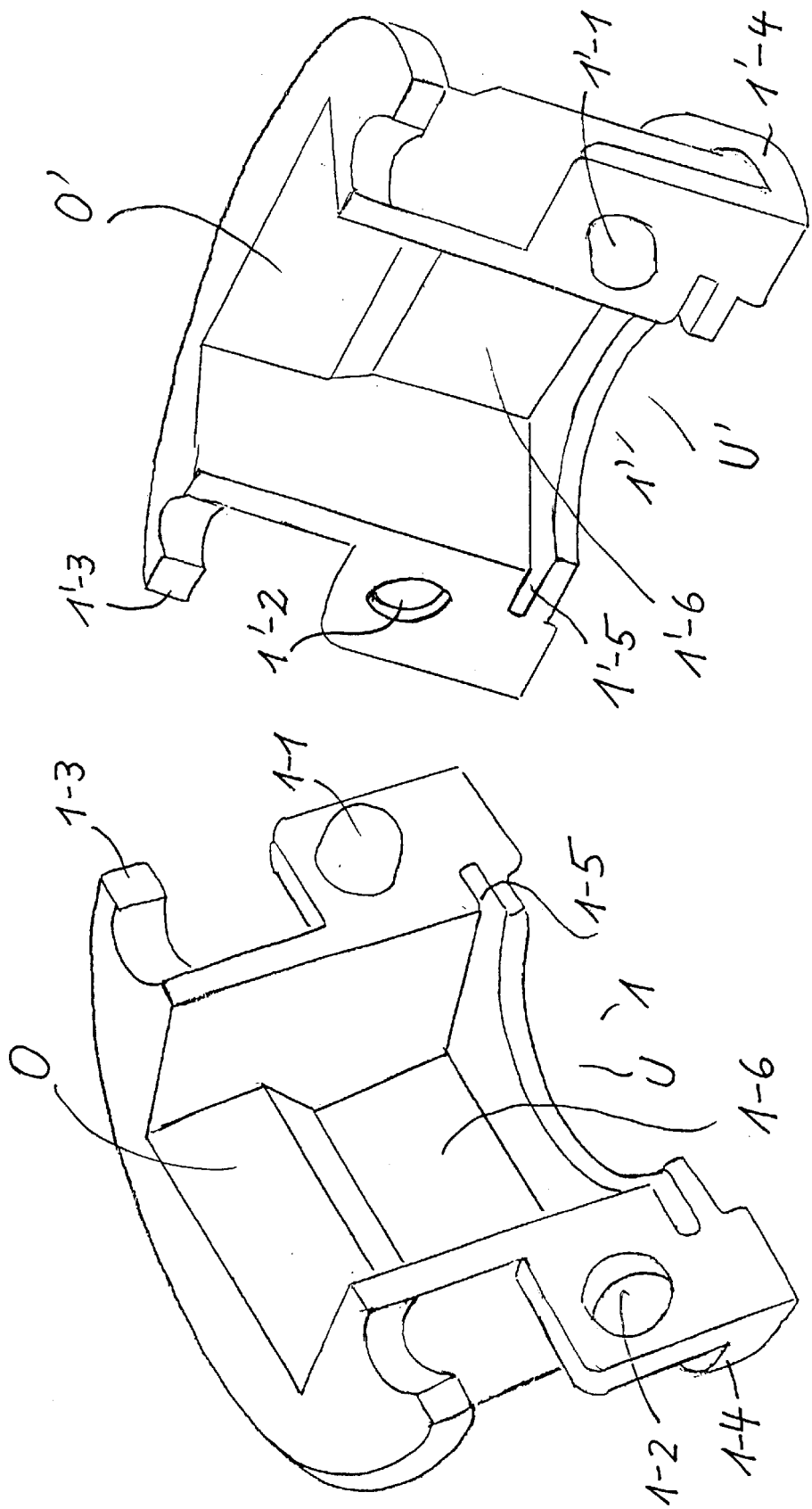
FIG. 1A illustrates a schematic perspective view of the retaining-spring insert arrangement in accordance with the invention, including two half chambers shown in exploded form.
Figure 1B:
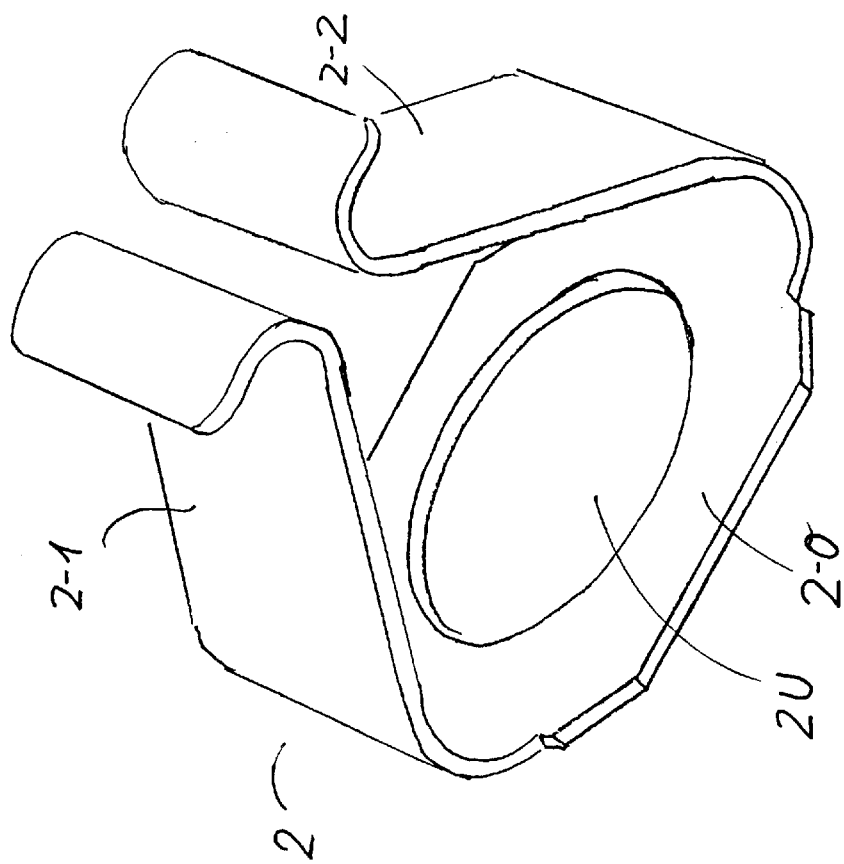
FIG. 1B illustrates a schematic perspective view of the retaining-spring with two free spring arms, whose ends are inclined towards one another.
Figure 2:
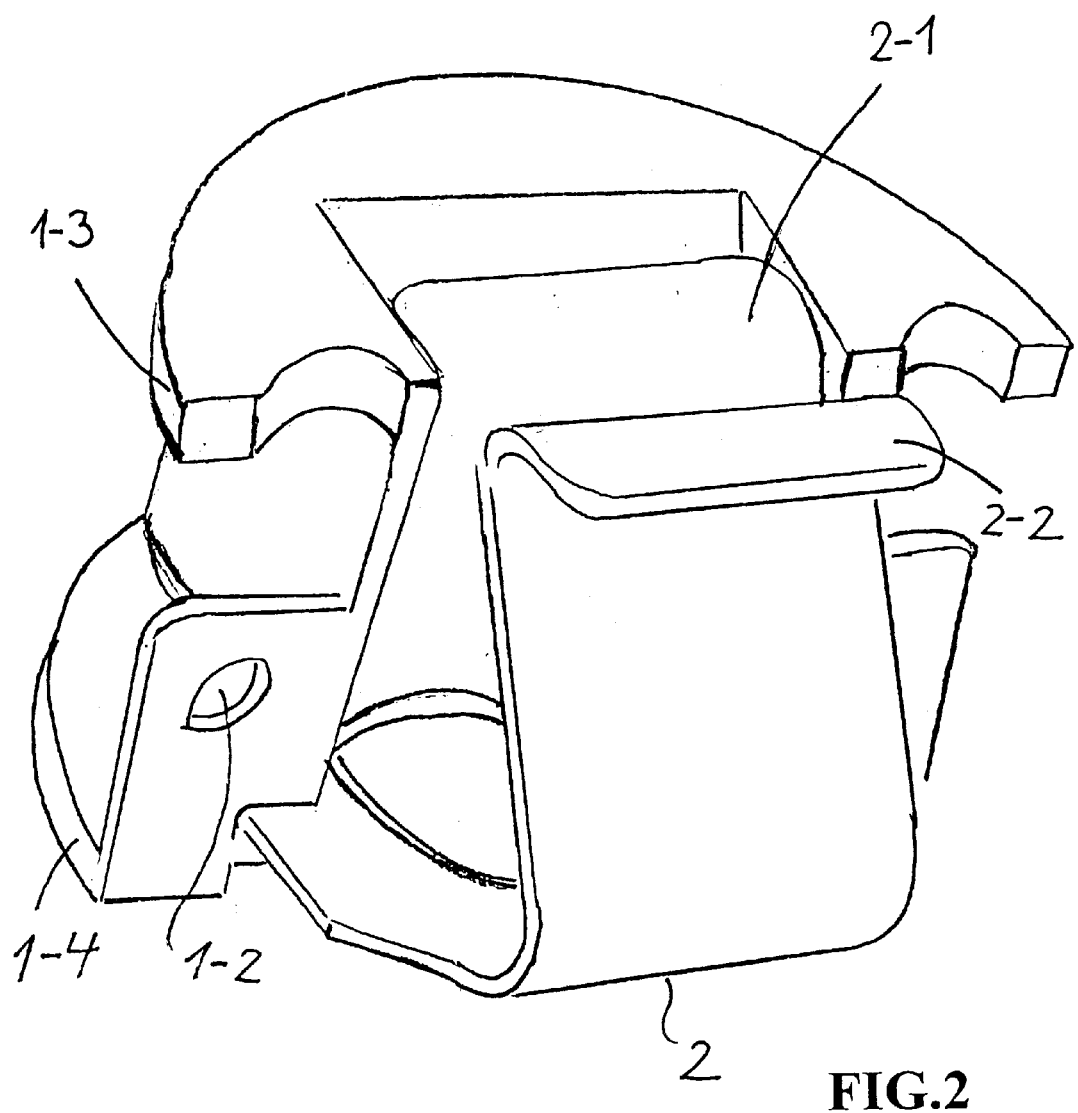
FIG. 2 illustrates a schematic perspective view of a chamber half in accordance with FIG. 1A, with the spring inserted in accordance with FIG. 1B.

FIG. 1A shows a schematic perspective view of a retaining-spring insert arrangement in accordance with the invention, which includes two half chambers 1 and 1' shown in exploded form. Both half chambers 1 and 1', which are preferably identical, are configured and serve to receive a retaining spring 2, as shown in FIG. 1B. Before joining half chambers 1 and 1', retaining spring 2 is inserted into one of the halves, e.g., half chamber 1, as shown in FIG. 2. Subsequently, the other half chamber, i.e., half chamber 1' (not shown in FIG. 2), is placed over the part of retaining spring 2 projecting from half chamber 1 and coupled to half chamber 1. The chamber containing retaining spring 2 and including half chambers 1 and 1' is now ready for use in ,or for connection with, a component (not shown).

The connection of the retaining-spring insert arrangement with a component is carried out, e.g., by adhesive bonding or casting the retaining-spring insert arrangement into a hole in the component. Other methods of connection are also possible, e.g., by pressing into a hole in the component, by adhesive bonding or bolting onto the component etc.

For accurate joining of half chambers 1 and 1', tappets 1—1 and 1'-1 and corresponding holes 1-2 and 1'-2 are provided as shown in FIG. 1A. Hole 1'-2 of half chamber 1' is arranged and serves to receive tappet 1—1 of half chamber 1, and hole 1-2 is arranged and serves to receive tappet 1'-1. Half chambers 1 and 1' have recesses 1-5 and 1'-5, and 1-6 and 1'-6 in their interiors, which are structured and arranged to receive portions of retaining spring 2. Recesses 1-5, 1'-5, 1-6, and 1'-6 are designed such that retaining spring 2 cannot move laterally or turn in its seat within the chamber, and the free ends of spring 2 have sufficient free space in recesses 1-6 and 1'-6 for movement of the free ends to engage and disengage corresponding recesses in a retaining bolt (not shown).

FIG. 1B shows a schematic perspective view of retaining-spring 2 with two free spring arms 2-1 and 2—2, whose ends are inclined towards one another.

Retaining spring 2 has a base part 2-0 with two sides arranged opposite one another, from which two free spring arms 2-1 and 2—2 issue or extend. Further, the ends of free spring arms 2-1 and 2—2 are inclined towards one another and are spaced from each other at a certain distance to allow the connecting bolt (not shown) to be inserted.

Base part 2-0 has a contour which is approximately square or rectangular, and the two opposing edges of base part 2-0, from which spring arms 2-1 and 2—2 issue, are located in groove-shaped recesses 1-5 and 1'-5 of half chambers 1 and 1', respectively. This ensures that base part 2-0 is securely seated in the chamber and cannot turn or move laterally.

The lower part of free spring arms 2-1 and 2—2 is arranged to be received in recesses 1-6 and 1'-6 of half chambers 1 and 1', respectively. The lateral walls of these recesses prevent any turning movement on the part of retaining spring 2. On the bottom and/or top surface of the chamber, there are openings O and O', and U and U', which are aligned with one another to allow the connecting bolt to pass through. Base part 2-0 of retaining spring 2 also has an opening 2-U, which is arranged to align with openings O and O', and U and U' when seated in the chamber.

Versions of a connecting arrangement including a retaining spring and connection bolt are also conceivable, where the chamber has only one upper opening for introducing the connecting bolt.

In the intended version of the retaining-spring insert arrangement in one component, the exterior of half chambers 1 and 1' has recesses and projections to prevent lateral or turning movement. This design is used especially when the retaining-spring insert arrangement is attached to a component by casting.

In addition, half chambers 1 and 1' have upper edge parts 1-3 and 1'-3 and lower edge parts 1-4 and 1'-4 which point outwardly.

Half chambers 1 and 1' can be manufactured, e.g., preferably from plastic. Through the division of the chamber into two parts, it is possible to arrange retaining spring 2 with a form fit within the chamber, without the spring having to be attached to the chamber, as required by the prior art.

Figure 3:
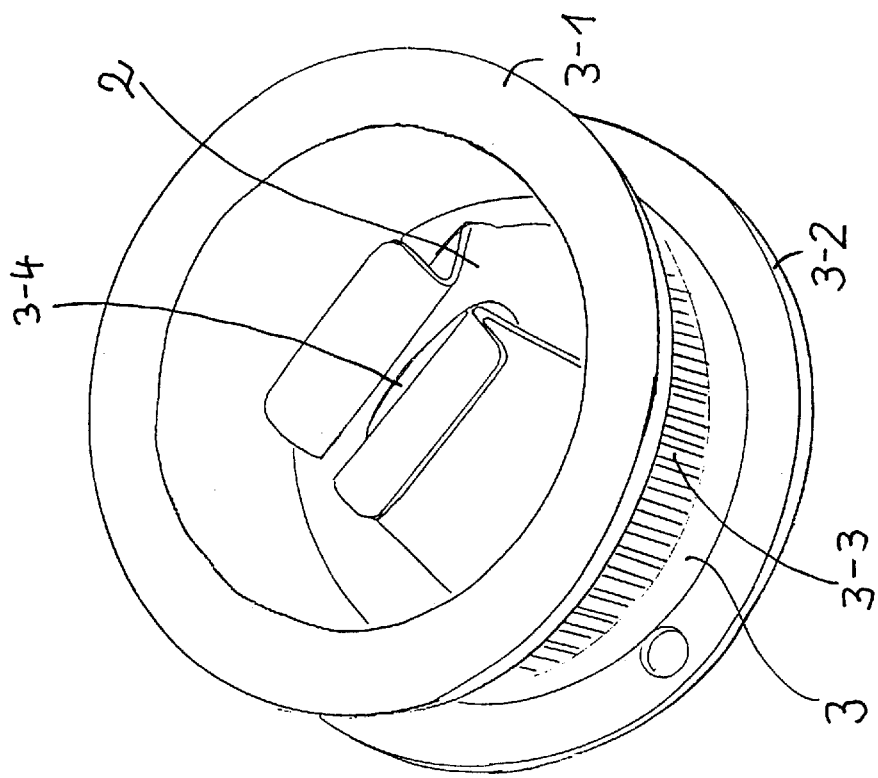
FIG. 3 illustrates a schematic perspective view of a retaining-spring insert arrangement in accordance with prior art.

FIG. 3 shows a schematic perspective view of a retaining-spring insert arrangement in accordance with prior art (e.g., part no. EC 11 S manufactured by SCHWARZ Verbindungs-Systeme GmbH, Germany). As shown, this arrangement includes a single-part cylindrical-cup chamber 3 of metal with an upper edge 3-1 and lower edge 3-2 pointing outwardly, and with ribbing 3—3 which is intended to ensure that the spring cannot turn in its seat within the component.

In the interior of the cup, retaining spring 2, similar to that discussed above in accordance with FIG. 2, is permanently attached to the bottom of the cup, e.g., by calking. The bottom of the chamber has an opening which is aligned with opening 3-4 of retaining spring 2.

Further, the present invention is not limited to the two-arm retaining spring depicted in the exemplary embodiments. Types of retaining springs with numbers of arms different than two are conceivable.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A retaining-spring insert arrangement comprising:
   two half chambers arranged to form a chamber with a hollow section; and
   a retaining spring arranged within said chamber that is adapted to engage a connecting part which is insertable into said chamber,
   wherein the retaining spring is mounted in recesses disposed in each of the two half chambers so as to prevent movement of the retaining spring in at least one direction.

2. The arrangement in accordance with claim 1, wherein said half chambers are connectable to one another via a projection and a corresponding recess arranged on opposing half chambers.

3. The arrangement in accordance with claim 2, wherein said projection comprises a tappet and said recess comprises a hole.

4. The arrangement in accordance with claim 1, wherein said half chambers are identical.

5. The arrangement in accordance with claim 1, wherein an exterior portion of said half chambers comprises recesses and projections arranged to prevent at least one of movement and turning of the insert when the insert is in an installed condition.

6. The arrangement in accordance with claim 1, wherein said half chambers have upper edge parts and lower edge parts which are arranged to point outwardly.

7. The arrangement in accordance with claim 1, wherein an interior of each half chamber comprises additional recesses and projections arranged to receive part of said retaining spring and to prevent at least one of movement and turning of said retaining spring in said chamber.

8. The arrangement in accordance with claim 1, wherein said retaining spring comprises at least one free arm having an end adapted to engage the connecting part.

9. The arrangement in accordance with claim 8, wherein said retaining spring comprises a base part with two free spring arms arranged to extend from opposite ends of said base part.

10. The arrangement in accordance with claim 9, wherein ends of said two free spring arms are inclined toward one another and are spaced from each other at a certain distance.

11. The arrangement in accordance with claim 9, wherein said base part has an approximately square or rectangular contour.

12. The arrangement in accordance with claim 1, wherein said retaining spring and said chamber comprise openings aligned with one another, which are adapted to receive the connecting part.

13. The arrangement in accordance with claim 12, wherein said opening of said chamber is arranged on one surface of said chamber.

14. The arrangement in accordance with claim 12, wherein said opening of said chamber is arranged on more than one surface of said chamber.

15. The arrangement in accordance with claim 1, wherein the insert is attached to another component by one of adhesive bonding and casting.

16. The arrangement in accordance with claim 1, wherein said half chambers are composed of plastic.

17. An apparatus for receiving a connecting part, comprising:
   a chamber comprising two half chambers arranged to form a hollow section; and
   a retaining spring located within said hollow section and arranged to engage at least a portion of the connecting part,
   wherein the retaining spring is mounted in recesses disposed in each of the half chambers so as to prevent movement of the retaining spring in at least one direction.

18. The apparatus in accordance with claim 17, wherein said two half chambers are coupled to each other via at least a projection and a corresponding recess.

19. The apparatus in accordance with claim 17, wherein a first half chamber includes a first projection and a first recess, and a second half chamber includes a second projection and a second recess, and
   wherein said first projection is arranged for insertion into said second recess and said second projection is arranged for insertion into said first recess.

20. The apparatus in accordance with claim 17, each of said two half chambers comprising additional recesses arranged to facilitate movement of at least a portion of said retaining spring during engagement with the at least a portion of the connecting part.

21. The apparatus in accordance with claim 17, wherein said chamber comprises at least one opening and said retaining spring comprises an opening aligned with said at least one opening, and
   wherein said at least one opening of said chamber and said opening of said retaining spring are adapted to permit passage of at least a part of the connecting part.

22. The apparatus in accordance with claim 17, wherein said chamber comprises an upper and a lower opening aligned with each other and said retaining spring comprises an opening aligned with said upper and lower openings, and
   wherein said upper and lower openings of said chamber and said opening of said retaining spring are adapted to permit passage of at least a part of the connecting part.

23. The apparatus in accordance with claim 17, said chamber comprising upper and lower edge parts extending radially outwardly.

24. An apparatus for receiving a connecting part, comprising:
- a chamber comprising two half chambers arranged to form a hollow section; and
- a retaining spring located within said hollow section and arranged to engage at least a portion of the connecting part,
- wherein each of said two half chambers comprise grooves arranged to slidably receive at least a portion of said retaining spring, thereby coupling said retaining spring to said chamber.

25. The apparatus in accordance with claim 24, wherein said retaining spring comprises at least two free arms extending from a base and directed toward each other.

26. The apparatus in accordance with claim 25, wherein the at least a portion of said retaining spring which is slidably received by said grooves is an edge of said base.

27. The apparatus in accordance with claim 25, wherein the at least a portion of said retaining spring which is slidably received by said grooves is a part of said base from which the at least two free arms do not extend.

28. The apparatus in accordance with claim 25, wherein said at least two free arms are spaced from each other, and engagement with the at least a portion of the connecting part at least initially separates the at least two free arms away from each other.

29. The apparatus in accordance with claim 25, wherein said at least two free arms are biased toward each other at least during engagement with the at least a portion of the connecting part.

30. The apparatus in accordance with claim 24, each of said two half chambers further comprising recesses arranged to facilitate pivotal movement of at least a portion of the retaining spring,
- wherein said grooves and said recesses are arranged to restrict rotation of said retaining spring within said hollow chamber.

31. The apparatus in accordance with claim 24, each of said two half chambers further comprising recesses arranged to facilitate pivotal movement of at least a portion of the retaining spring,
- wherein said grooves and said recesses are arranged to rotatably fix said retaining spring within said hollow chamber.

32. A retaining-spring insert arrangement comprising:
- a first half chamber part comprising at least one internal recess;
- a second half chamber part comprising at least one internal recess;
- the first and second half chamber parts forming an insert chamber with a hollow section;
- a retaining spring arranged within said insert chamber and being adapted to engage a connecting part when inserted into said insert chamber;
- the retaining spring having movable spring arms and a base which is non-movably mounted in each at least one internal recess of the first and second half chamber parts; and
- each at least one internal recess being configured to slidably receive a portion of the base.

* * * * *